United States Patent
Hackl

(10) Patent No.: US 12,486,460 B2
(45) Date of Patent: Dec. 2, 2025

(54) METHOD AND TREATMENT FACILITY FOR PHYSICAL AND THERMOCHEMICAL TREATMENT OF BIOMASS

(71) Applicant: Next Generation Elements GmbH, Feldkirchen an der Donau (AT)

(72) Inventor: Andreas Hackl, Gmunden (AT)

(73) Assignee: Next Generation Elements GmbH, Feldkirchen an der Donau (AT)

(*) Notice: Subject to any disclaimer, the term of this patent is extended or adjusted under 35 U.S.C. 154(b) by 304 days.

(21) Appl. No.: 18/018,077

(22) PCT Filed: Aug. 9, 2021

(86) PCT No.: PCT/AT2021/060276
§ 371 (c)(1),
(2) Date: Jan. 26, 2023

(87) PCT Pub. No.: WO2022/032317
PCT Pub. Date: Feb. 17, 2022

(65) Prior Publication Data
US 2023/0295516 A1  Sep. 21, 2023

(30) Foreign Application Priority Data

Aug. 10, 2020 (AT) .................................. 50670/2020
Dec. 22, 2020 (AT) .................................. 51129/2020

(51) Int. Cl.
*C10B 57/10* (2006.01)
*C01C 1/22* (2006.01)
(Continued)

(52) U.S. Cl.
CPC .............. *C10B 57/10* (2013.01); *C01C 1/22* (2013.01); *C01C 1/242* (2013.01); *C02F 11/10* (2013.01);
(Continued)

(58) Field of Classification Search
CPC ........................... F23G 5/04; C02F 11/06–148
See application file for complete search history.

(56) References Cited

U.S. PATENT DOCUMENTS

| | | | |
|---|---|---|---|
| 6,588,349 B1 * | 7/2003 | Ahtila | F23G 5/04 110/304 |
| 8,198,493 B1 | 6/2012 | Livingston et al. | |
| 8,765,089 B2 | 7/2014 | Hunsinger | |
| 2013/0068605 A1 * | 3/2013 | Rovner | C10B 53/02 202/117 |

(Continued)

FOREIGN PATENT DOCUMENTS

| | | |
|---|---|---|
| CN | 101421018 A | 4/2009 |
| CN | 102311742 A | 1/2012 |

(Continued)

OTHER PUBLICATIONS

International Search Report in PCT/AT2021/060276, mailed Dec. 8, 2021.

*Primary Examiner* — Jonathan Luke Pilcher
(74) *Attorney, Agent, or Firm* — Collard & Roe, P.C.

(57) ABSTRACT

In a method for physical and thermochemical treatment of biomass, the biomass moisture content is reduced in a dryer and ammonia ($NH_3$) is also released from the biomass during drying. The dried biomass is then either pyrolyzed in a pyrolysis reactor and the pyrolysis gas is forwarded to and combusted in a combustion device to form flue gas, or is combusted in a combustion facility unit to form flue gas. In either case the flue gas is fed to a mixer. Oxygen ($O_2$) is metered to the flue gas in the mixer and is fed directly to the dryer as drying gas. As the drying gas passes through the dryer, the sulfur dioxide ($SO_2$) contained in the drying gas and/or the sulfur trioxide ($SO_3$) chemically reacts with the ammonia ($NH_3$) to form ammonium sulfite (($NH_4)_2SO_3$) and/or ammonium sulfate (($NH_4)_2SO_4$). Also a treatment facility physically and thermochemically treats the biomass.

20 Claims, 2 Drawing Sheets

Figure 1:
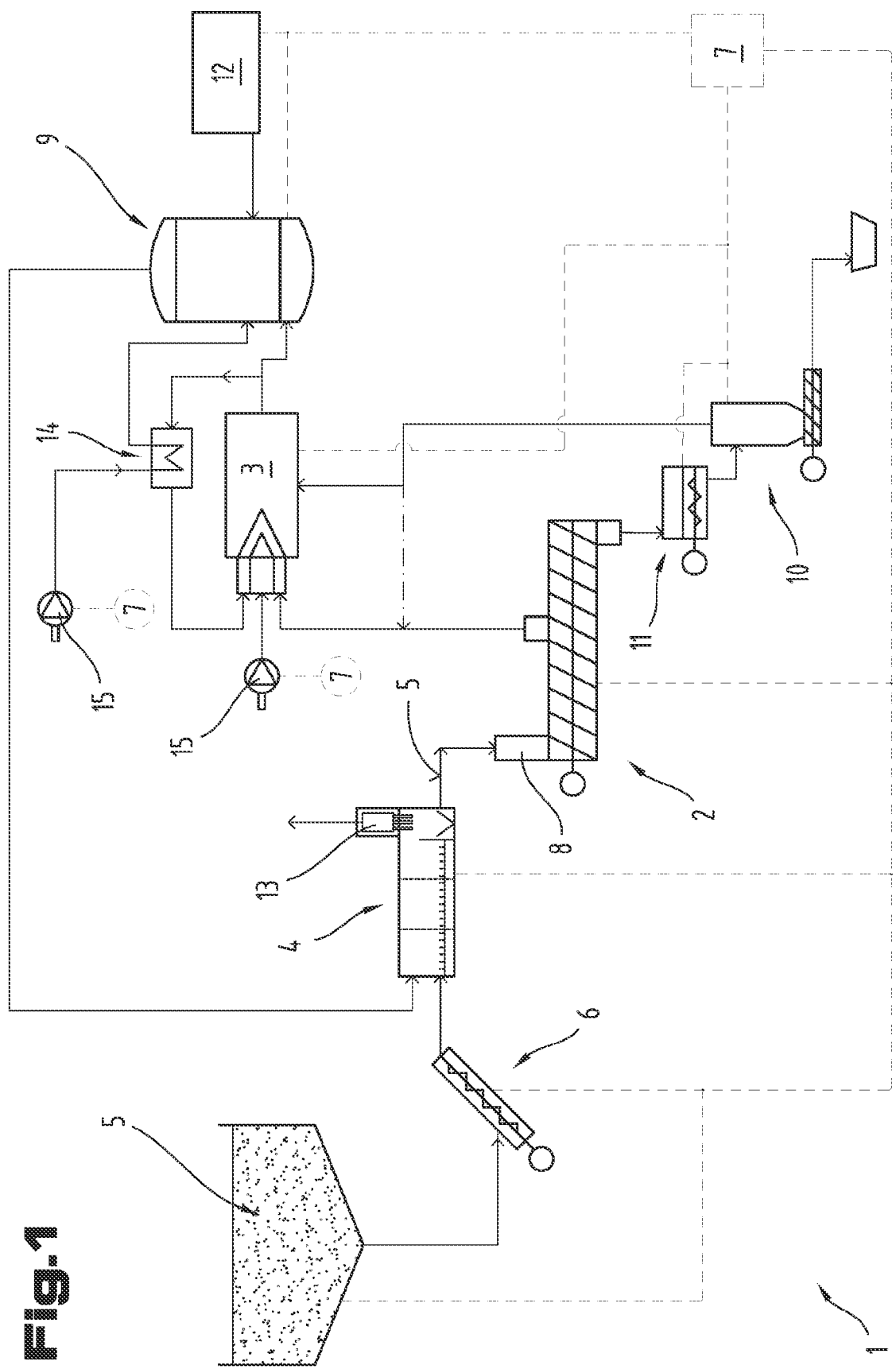

(51) Int. Cl.
*C01C 1/242* (2006.01)
*C02F 11/10* (2006.01)
*C02F 11/13* (2019.01)
*C10B 53/00* (2006.01)
*C10B 53/02* (2006.01)
*F23G 5/04* (2006.01)
*F23G 7/00* (2006.01)
*C10B 7/10* (2006.01)

(52) U.S. Cl.
CPC .............. *C02F 11/13* (2019.01); *C10B 53/00* (2013.01); *C10B 53/02* (2013.01); *F23G 5/04* (2013.01); *F23G 7/001* (2013.01); *C10B 7/10* (2013.01); *C10J 2300/0909* (2013.01); *C10J 2300/092* (2013.01); *C10J 2300/0923* (2013.01); *F23G 2201/10* (2013.01); *F23G 2201/303* (2013.01); *F23G 2201/304* (2013.01); *F23G 2206/10* (2013.01); *F23G 2207/30* (2013.01); *F23G 2207/60* (2013.01); *F23G 2209/12* (2013.01); *F23G 2209/262* (2013.01); *F23G 2900/00001* (2013.01); *F23G 2900/50001* (2013.01)

(56) References Cited

U.S. PATENT DOCUMENTS

| | | |
|---|---|---|
| 2017/0037334 A1 | 2/2017 | Mennell et al. |
| 2019/0169518 A1 | 6/2019 | Mennell et al. |
| 2021/0292208 A1 | 9/2021 | Chatterjee |

FOREIGN PATENT DOCUMENTS

| | | |
|---|---|---|
| CN | 102607041 A | 7/2012 |
| CN | 110746070 A | 2/2020 |
| CN | 111249894 A | 6/2020 |
| DE | 203 21 670 U1 | 10/2008 |
| DE | 10 2008 028 241 A1 | 12/2009 |
| DE | 10 2010 049 339 A1 | 4/2012 |
| EP | 2 522 708 A2 | 11/2012 |
| EP | 3081622 A1 | 10/2016 |
| EP | 3508556 A1 | 7/2019 |
| JP | S51-128147 A | 11/1976 |
| KR | 100334692 B1 | 5/2002 |
| KR | 20090103319 A | 10/2009 |
| KR | 20110079247 A | 7/2011 |
| WO | 2012038001 A1 | 3/2012 |
| WO | 2014/128357 A1 | 8/2014 |
| WO | 2020/021345 A1 | 1/2020 |

\* cited by examiner

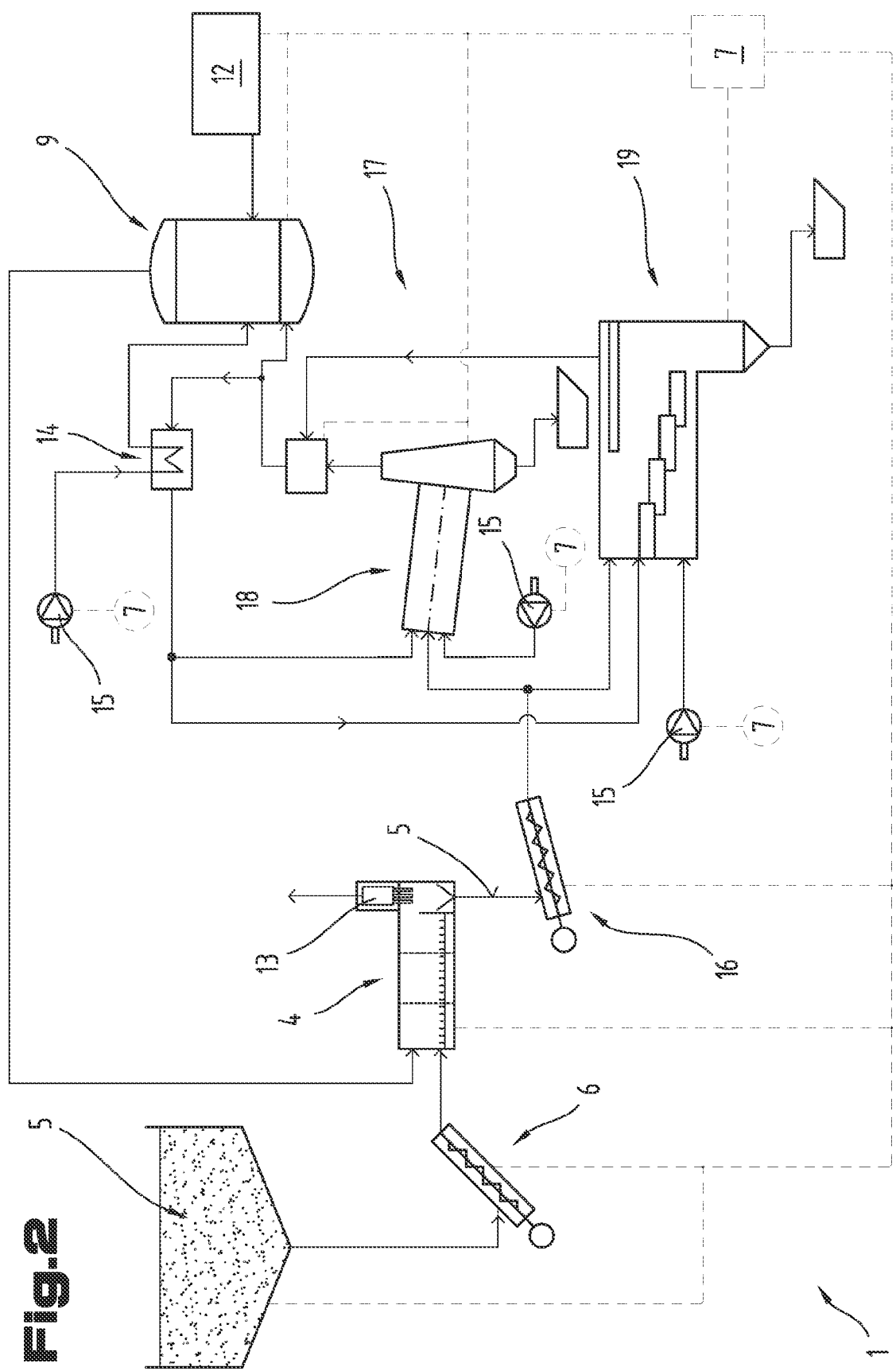

METHOD AND TREATMENT FACILITY FOR PHYSICAL AND THERMOCHEMICAL TREATMENT OF BIOMASS

CROSS REFERENCE TO RELATED APPLICATIONS

This application is the National Stage of PCT/AT2021/060276 filed on Aug. 9, 2021, which claims priority under 35 U.S.C. § 119 of Austrian Application No. A 50670/2020 filed on Aug. 10, 2020 and Austrian Application No. A 51129/2020 filed on Dec. 22, 2020, the disclosures of which are incorporated by reference. The international application under PCT article 21(2) was not published in English.

The invention relates to a combined method for the physical and thermochemical treatment of biomass, in particular of organic waste products such as sludge from sewage treatment plants, biogas plants, slaughterhouses, agricultural and forestry operations, animal husbandry, food industry, paper industry, chemical industry. Furthermore, the invention also relates to a treatment facility by means of which the physical and thermochemical treatment of the biomass can be carried out.

DE 10 2008 028 241 A1 describes a device for the thermochemical transformation of biomass into a fuel gas. In this regard, the device consists of a snail reactor and a further reactor. In the snail reactor, the biomass is dried and pyrolyzed under air exclusion, wherein the resulting pyrolysis coke, pyrolysis gas, and steam are fed together to the further reactor and said reactor is filled forming a pyrolysis coke bed. In the further reactor, a partial oxidation takes place by substoichiometric addition of a gasification agent, in particular air. In this regard, the long-chain tar molecules are at least partially broken down. The residual substances are removed at the bottom from the further reactor by means of a discharge device. In order to prevent clogging of inlet openings for the gasification agent and/or outlet openings for the fuel gas in the region of the reactor wall, a plurality of interior expansions extending at least partially in the direction of gravity are provided. The resulting fuel gas is fed via its own outlet openings to a gas filter and a gas cooler. The purified fuel gas flowing out of the outlet of the gas cooler is then fed, for example, to a gas engine. The electrical energy generated in the gas engine can be fed into the supply network, wherein the heat that also results can be used to heat the aforementioned screw reactor.

DE 10 2010 049 339 A1 describes a device and a method for drying goods in a spin-wave dryer. The material to be dried is conveyed in succession through the dryer in the direction of passage into segments arranged one after the other and subdivided by means of mobile separating walls. The drying air supplied can either flow through the drying chamber through connecting openings provided in the area of the separating walls or be fed to each of the segments and also discharged again. Flue gases can also be used directly for drying, wherein these originate from an external combustion chamber. This may be a conventional oil or gas burner. However, a biomass burner for pellets can also be used, as is described in DE 203 21 670 U1.

It is the object of the present invention to provide a method as well as a treatment facility for the physical and thermochemical treatment of biomass, by means of which a reduction or prevention of problematic materials without the use of additives and a higher energy efficiency in the operation of the entire treatment facility is possible.

This object is achieved by means of a method and a treatment facility according to the claims.

The method according to the invention is provided for the physical and thermochemical treatment of biomass, in particular of organic waste in a treatment facility. The organic waste products preferably are diverse sludges from sewage treatment plants, slaughterhouses, agricultural and forestry operations, animal husbandry, food industry, paper industry and the chemical industry. To perform the method, the following steps are to be carried out:
   providing the biomass to be treated,
   providing a drying device,
   providing at least one pyrolysis reactor,
   providing at least one combustion device,
   providing at least one mixing device,
   feeding the provided biomass to be treated into the drying device, wherein the moisture contained in the biomass is reduced and ammonia ($NH_3$) is released from the biomass during the drying process,
   discharging the biomass to be treated from the drying device,
   feeding the biomass to be treated into the pyrolysis reactor,
   pyrolyzing the biomass in the pyrolysis reactor and, in the course of this, thermally decomposing the biomass into pyrolysis coke and pyrolysis gas,
   discharging the pyrolysis coke and discharging the pyrolysis gas from the pyrolysis reactor,
   feeding the pyrolysis gas discharged from the pyrolysis reactor into the combustion device and combusting the pyrolysis gas thus forming a flue gas,
   discharging the flue gas from the combustion device and feeding the flue gas into the mixing device,
   adding oxygen ($O_2$) and or at least an oxygen ($O_2$)-containing gas to the flue gas in the mixing device and forming a drying gas, said drying gas containing, inter alia, sulfur dioxide ($SO_2$) and/or sulfur trioxide ($SO_3$), each in a gaseous aggregate state,
   discharging the drying gas from the mixing device and feeding the drying gas into the drying device,
   guiding the drying gas through the drying device, wherein the sulfur dioxide ($SO_2$) and/or the sulfur trioxide ($SO_3$), which is inter alia contained in the drying gas, chemically reacts with the ammonia ($NH_3$) to ammonium sulfite (($NH_4)_2SO_3$) and/or ammonium sulfate (($NH_4)_2SO_4$).

The advantage of the presently selected method steps is that the flue gas discharged from the combustion device is fed to the drying device as a so-called drying gas immediately after the addition of a certain volume share of oxygen or an oxygen-containing gas. Hence, the heat energy contained in the flue gas including the respective sulfur oxide(s) contained therein is used in the drying device. Hence, the addition of at least one separate additive, to bind the ammonia that results or is released in the drying process, in the drying device is avoided such that it does not have to be separately treated or filtered before the dryer exhaust gas or the dryer exhaust air is discharged to the surroundings. Furthermore, hence, a cohesive, compact treatment facility is created in which no additional facility components for the provision of the drying gas, such as a block-type thermal power station or other combustion facilities, are required for permanent operation. Preferably, the performance of the method steps is carried out in the order listed above.

Furthermore, an approach is advantageous in which the drying gas is brought to a temperature value in the mixing device, which is in a temperature value range the lower limit of which is 100° C., in particular 300° C., and the upper limit of which is 700° C., in particular 500° C. Thus, the possibility is created to bring the flue gas, by adding usually cooler ambient air, to the temperature value or temperature value range which is required for the use in the drying device to carry out a proper drying operation.

A further advantageous approach is characterized in that the drying gas in the mixing device is brought to an oxygen content in an oxygen content value range the lower limit of which is 6 vol %, in particular 15 vol %, and the upper limit of which is 20 vol %, in particular 17 vol %, by adding the oxygen ($O_2$) and/or at least the oxygen ($O_2$)-containing gas. By the determination, in particular the reduction, of the oxygen content in the drying gas discharged from the mixing device, a drying atmosphere can be achieved in the drying device which impedes the danger of a fire and/or an explosion. During the drying process, dust particles are formed, among other things, which can lead to a dust explosion as a result of the not inconsiderably high drying temperature. This means that statutory requirements can be met, as the drying temperature is at a critical level.

A method variant in which a further flue gas originating from a block-type thermal power station is fed to the mixing device is also advantageous. Hence, in a possible combination, an even larger amount of drying gas can be provided for drying the biomass in the drying device. Thus, an even better or higher degree of drying of the biomass can be achieved, so as to be able to subsequently perform a quicker treatment in the pyrolysis reactor. In this way, an even better energy efficiency can be achieved.

Furthermore, an approach is advantageous in which the further flue gas is fed to the mixing device with a temperature value, which is in a temperature value range the lower limit of which is 100° C., in particular 200° C., and the upper limit of which is 500° C., in particular 300° C. Hence, in combination with the flue gas fed from the combustion device, which originates from the combustion of at least the pyrolysis gas, a predetermined temperature level of the drying gas can be achieved more easily.

A further advantageous approach is characterized in that a partial quantity of the flue gas discharged from the combustion device is branched off before being fed into the mixing device, this partial quantity of the flue gas is passed through a heat exchanger and the flue gas temperature is reduced, and subsequently the branched-off flue gas is fed to the combustion device for combustion. Hence, a certain extent of heat energy can be provided for an additional heating process. In addition to this, hence, further thermal energy can be generated by the return to the combustion device and the combustion process.

A method variant in which ambient air is passed through the heat exchanger as the oxygen ($O_2$)-containing gas and the temperature is raised by means of the flue gas passed through and the ambient air is subsequently fed to the mixing device and metered into the flue gas is also advantageous. Thus, the heat energy contained in the branched-off flue gas can be transferred to control the temperature of the ambient air, which is fed to the mixing device. Furthermore, a temperature control in the combustion chamber of the combustion device can also be achieved by the flue gas that is fed back by the temperature reduction.

Another approach is characterized in that the pyrolysis coke discharged from the pyrolysis reactor is fed to a provided coke treatment device and is further decomposed in the coke treatment device into a solid, in particular free-flowing, residue product and into a coke exhaust gas. Thus, a further additional treatment of the biomass already treated in the pyrolysis reactor can be performed. This enables an even more intensive and comprehensive treatment in a two-stage process. Thus, depending on the biomass selected, in particular organic waste products, a recovery of the valuable material contained therein, in particular phosphorus or phosphorus compounds, phosphates, potassium, calcium, magnesium or the like, can be achieved even better.

Further, an approach is advantageous in which the residue product is discharged from the coke treatment device being spatially separated from the coke exhaust gas. Hence, an additional gas that can be used in the combustion device can be provided to thus additionally increase the energy efficiency.

A further advantageous approach is characterized in that the coke exhaust gas discharged from the coke treatment device is fed into the combustion device and the coke exhaust gas is combusted in the combustion device thus forming a flue gas and is also discharged therefrom. Hence, an even higher heat energy can be provided in the combustion device.

A method variant, in which the pyrolysis gas and the coke exhaust gas are fed into the combustion device separately from one another is also advantageous. By the separate feed of the pyrolysis gas and the coke exhaust gas into the combustion device, hence, an even more complete and better combustion can be achieved, whereby the heat extraction can additionally be increased accordingly.

Another approach is characterized in that the pyrolysis gas and the coke exhaust gas are fed into the combustion device together. Hence, a certain mixing can be achieved already before feeding the gases into the combustion device.

A further advantageous approach is characterized in that the ammonium sulfite (($NH_4$)$_2SO_3$) and/or the ammonium sulfate (($NH_4$)$_2SO_4$) formed in the drying device is or are fed to the pyrolysis reactor together with the dried biomass. Hence, a subsequent common treatment process can be performed in the pyrolysis reactor.

The object of the present invention, namely to provide a physical and thermochemical treatment process of the biomass, and, in the course of this, allow for a reduction or prevention of problematic materials without the use of additives and a higher energy efficiency in the operation of the entire treatment facility, is achieved optionally separately and individually by a further method according to the method steps described in this regard.

The further method is also provided for the physical and thermochemical treatment of biomass, in particular of organic waste in a treatment facility. The organic waste products preferably are diverse sludges from sewage treatment plants, slaughterhouses, agricultural and forestry operations, animal husbandry, food industry, paper industry and the chemical industry. To perform the method, the following steps are to be carried out:

providing the biomass to be treated,
providing a drying device,
providing a combustion facility unit with at least one combustion reactor,
providing at least one mixing device,
feeding the provided biomass to be treated into the drying device, wherein the moisture contained in the biomass is reduced and ammonia (NH3) is released from the biomass during the drying process,
discharging the biomass to be treated from the drying device,
feeding the biomass to be treated into the at least one combustion reactor, combusting the biomass in the at least one combustion reactor and, in the course of this, oxidatively converting the biomass into a combustion product and flue gas, discharging the combustion product and discharging the flue gas from the at least one combustion reactor, feeding the flue gas into the mixing device, adding oxygen ($O_2$) and or at least an oxygen ($O_2$)-containing gas to the flue gas in the mixing device and forming a drying gas, said drying gas containing, inter alia, sulfur dioxide ($SO_2$) and/or sulfur trioxide ($SO_3$), each in a gaseous aggregate state, discharging the drying gas from the mixing device and feeding the drying gas into the drying device, guiding the drying gas through the drying device, wherein the sulfur dioxide ($SO_2$) and/or the sulfur trioxide ($SO_3$), which is inter alia contained in the drying gas, chemically reacts with the ammonia ($NH_3$) to ammonium sulfite (($NH_4)_2SO_3$) and/or ammonium sulfate (($NH_4)_2SO_4$).

The advantage of the presently selected method steps is that the flue gas formed in the combustion facility unit and discharged from the combustion facility unit is fed to the drying device as a so-called drying gas immediately after the addition of a certain volume share of oxygen or an oxygen-containing gas. Hence, the heat energy contained in the flue gas including the respective sulfur oxide(s) contained therein is used in the drying device. Hence, here as well, the addition of at least one separate additive, to bind the ammonia that results or is released in the drying process, in the drying device is avoided such that it does not have to be separately treated or filtered before the dryer exhaust gas or the dryer exhaust air is discharged to the surroundings. Furthermore, hence, a cohesive, compact treatment facility is created in which preferably no additional facility components for the provision of the drying gas, such as a block-type thermal power station or other combustion facilities, are required obligatorily for permanent operation. Preferably, the performance of the method steps is carried out in the order listed above.

Furthermore, an approach is advantageous in which the combustion facility unit is formed of multiple combustion reactors and that the flue gas in each case formed in these during the combustion is fed to the mixing device. Thus, the overall throughput can be increased in order to be able to combust a sufficiently high mass or quantity downstream of the drying device. Thus, a lower degree of drying is sufficient in the drying device.

A further advantageous approach is characterized in that the drying gas is brought to a temperature value in the mixing device, which is in a temperature value range the lower limit of which is 100° C., in particular 300° C., and the upper limit of which is 700° C., in particular 500° C. Thus, the possibility is created to bring the flue gas, by adding usually cooler ambient air, to the temperature value or temperature value range which is required for the use in the drying device to carry out a proper drying operation.

A method variant, in which the drying gas in the mixing device is brought to an oxygen content in an oxygen content value range the lower limit of which is 6 vol %, in particular 15 vol %, and the upper limit of which is 20 vol %, in particular 17 vol %, by adding the oxygen ($O_2$) and/or at least the oxygen ($O_2$)-containing gas is also advantageous. By the determination, in particular the reduction, of the oxygen content in the drying gas discharged from the mixing device, a drying atmosphere can be achieved in the drying device which impedes the danger of a fire and/or an explosion. During the drying process, dust particles are formed, among other things, which can lead to a dust explosion as a result of the not inconsiderably high drying temperature. This means that statutory requirements can be met, as the drying temperature is at a critical level.

Another approach is characterized in that a partial quantity of the flue gas discharged from the combustion facility unit is branched off before being fed into the mixing device, this partial quantity of the flue gas is passed through a heat exchanger and the flue gas temperature is reduced, and subsequently the branched-off flue gas is fed to the combustion facility unit for combustion. Hence, a certain extent of heat energy can be provided for an additional heating process. In addition to this, hence, further thermal energy can be generated by the return to the combustion facility unit with its at least one combustion reactor and the combustion process.

Furthermore, an approach is advantageous in which ambient air is passed through the heat exchanger as the oxygen ($O_2$)-containing gas and the temperature is raised by means of the flue gas passed through and the ambient air is subsequently fed to the mixing device and metered into the flue gas. Thus, the heat energy contained in the branched-off flue gas can be transferred to control the temperature of the ambient air, which is fed to the mixing device. Furthermore, a temperature control in the combustion chamber(s) of the combustion facility unit can also be achieved by the flue gas that is fed back by the temperature reduction.

Lastly, a further advantageous approach is characterized in that the ammonium sulfite (($NH_4)_2SO_3$) and/or the ammonium sulfate (($NH_4)_2SO_4$) formed in the drying device is or are fed to the combustion facility unit together with the dried biomass. Hence, a subsequent common treatment process can be performed in the combustion facility unit.

The object of the present invention, namely to create a treatment facility to perform a physical and thermochemical treatment process of the biomass, and, in the course of this, allow for a reduction or prevention of problematic materials without the use of additives and a higher energy efficiency in the operation of the entire treatment facility, is achieved optionally separately and individually by the treatment facility according to the features described in this regard.

The treatment facility is configured, in particular, to perform the treatment process of the biomass and its combustion in the combustion facility unit. The treatment facility comprises a drying device, said drying device being configured to reduce the moisture contained in the biomass, and wherein, further, ammonia ($NH_3$) can be released from the biomass during the drying process in the drying device, a combustion facility unit with at least one combustion reactor, said at least one combustion reactor being configured to combust the biomass fed to it, and, in the course of this, oxidatively convert the biomass into a combustion product and flue gas, at least one mixing device, said mixing device being configured to perform an addition of oxygen ($O_2$) and/or at least one oxygen ($O_2$)-containing gas to the flue gas fed to the mixing device from the combustion facility unit to form a drying gas, wherein the drying gas formed by means of the mixing device contains, inter alia, sulfur dioxide ($SO_2$) and/or sulfur trioxide ($SO_3$), each in a gaseous aggregate state, a drying gas supply line, by means of which drying gas supply line the at least one mixing device is in line connection with the drying device, and which is configured to supply the drying gas formed in the mixing device to the drying device.

The advantage achieved by this consists in that the flue gas formed in the combustion facility unit and discharged from the combustion facility unit can be fed to the drying device as a so-called drying gas immediately after the addition of a certain volume share of oxygen or an oxygen-containing gas. Hence, the heat energy contained in the flue gas including the respective sulfur oxide(s) contained therein is used in the drying device. Hence, here as well, the addition of at least one separate additive, to bind the ammonia that results or is released in the drying process, in the drying device is avoided such that it does not have to be separately treated or filtered before the dryer exhaust gas or the dryer exhaust air is discharged to the surroundings. Furthermore, hence, a cohesive, compact treatment facility is created in which preferably no additional facility components for the provision of the drying gas, such as a block-type thermal power station or other combustion facilities, are required obligatorily for permanent operation.

Furthermore, it can be advantageous for the combustion facility unit to comprise multiple combustion reactors and for each one of the combustion reactors to be in line connection with the mixing device. By the use of multiple combustion reactors, hence, a larger amount of biomass can be subjected to the treatment and treated in an otherwise longer period of time.

Another embodiment is characterized in that the at least one combustion reactor is selected from the group of a rotary kiln, a fluidized bed furnace, a furnace for carrying out dust firing or cycloid firing, or a furnace with grate firing, such as a stair kiln. Thus, diverse biomasses can be subjected to their combustion and the treatment facility can be adapted to the respective requirements.

A further possible embodiment has the features that the treatment facility further comprises a block-type thermal power station and a further flue gas originating from the block-type thermal power station can be supplied to the mixing device via a supply line. This makes it possible, if required, to also provide an additional flue gas for the mixing device and to subsequently feed it into the drying device as a mixed drying gas.

For the purpose of better understanding of the invention, it will be elucidated in more detail by means of the figure below.

These show, in very simplified schematic representation:

FIG. 1 a first installation model of a treatment facility with indicated facility components;

FIG. 2 a second possible installation model of a treatment facility with indicated facility components.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "in particular" shall henceforth be understood to mean that it may refer to a possible more specific formation or more detailed specification of an object or a process step, but need not necessarily depict a mandatory, preferred embodiment of same or a mandatory practice.

In their present use, the terms "comprising", "has", "having", "includes", "including", "contains", "containing" and any variations thereof are meant to cover a non-exclusive inclusion.

A further term used is "optional". This is understood to mean that this method step is principally present but depending on the operating conditions may be used although that does not necessarily have to be the case.

The two figures, FIGS. 1 and 2, each show an installation mode, wherein the flue gas can be formed by means of different facility components in each case, said flue gas then being used for drying the biomass to be treated. Merely the facility components, by means of which the flue gas is formed, differ from one another. Subsequently, the drying gas is formed from the flue gas. The respective possible facility components and method steps will be described in detail below.

In each case, a combined method for the physical and thermochemical treatment of the biomass is provided. The term thermochemical treatment refers to both, direct and indirect methods. In the direct methods, a combustion of the biomass is performed, while in the indirect methods, a pyrolysis or a gasification of the biomass is performed.

Initially, the differences between the possible treatment methods regarding the used share of oxygen and the combustion air ratio of the fuel oxygen (air) mixture and the lambda value are briefly explained. The lambda value is a dimensionless key figure from combustion theory that indicates the mass ratio of oxygen (air) to fuel relative to the respective stoichiometrically ideal ratio for a theoretically complete combustion process. From this key figure, conclusions can be drawn about the combustion process, temperatures, pollutant formation and efficiency.

Pyrolysis is usually carried out at an oxygen content of 0% and thus a lambda value of 0 ($\lambda=0=$). However, in certain cases, a very minimal amount of oxygen of very few percent may also be present during pyrolysis.

Gasification is somewhere in between pyrolysis and combustion. Gasification is usually characterized by a substoichiometric thermochemical oxidative conversion with the formation of a synthetic combustible gas with a lambda value greater than 0 and less than 1 ($0<\lambda<1$).

Depending on the material to be combusted, the combustion requires such a high oxygen content that the lambda value is at least equal to 1 or greater than 1 ($\lambda \geq 1$). Mostly or preferably, however, more oxygen ($O_2$) is supplied or provided during combustion than would be necessary or required for the oxidative conversion of the organics.

FIG. 1, in a simplified and highly stylized representation, shows an installation model of a treatment facility 1 which comprises at least one pyrolysis reactor 2, at least one combustion device 3 and at least one drying device 4 for a biomass 5 to be treated.

In general, the treatment facility 1 is provided to treat the biomass 5 in a thermochemical treatment process or in a thermochemical treatment operation. The treatment of the biomass 5 is carried out in a combined process, namely by means of a physical treatment and the thermochemical treatment. Here, in particular organic waste products are understood as the so-called biomass 5. Organic waste products, inter alia, include sludge or sludge-like substances from sewage treatment plants, slaughterhouses, agricultural operations, animal husbandry, the food industry, the paper industry, and the chemical industry. These can be, for example, sewage sludge, slaughterhouse waste, carcass meal, excrements and much more. The term biomass 5 is understood or implied to include all masses where organic compounds are contained or found in complex or less complex forms. To allow for the treatment of the biomass 5 to be carried out, e.g. the sludge must contain organic, thermally convertible connections.

A possible aspect of the invention can consist in the economic treatment of the biomass 5 and the recovery of at least one valuable material contained in the biomass. The valuable material can, for example, be phosphorus (P) or a phosphorus compound such as $P_2O_5$, potassium, calcium, magnesium, or the like. A further possible aspect of the invention can consist in the reduction or prevention of problematic materials and in the energy efficiency of the overall treatment facility 1.

Depending on the type and composition of the biomass 5, it has been differently disposed of or further process until now. A first possibility is the thermal utilization by combustion in waste incineration plants, a cement plant, or similar plants. A further possibility, in particular in the case of sewage sludge, is the agricultural spreading on fields. In this case, however, all the pollutants, microplastics and the like contained in the sewage sludge are distributed on the fields and thus also enter the groundwater. Finally, composting or humification can also take place.

At least a quantitative proportion of the biomass 5, in particular, however, the entire amount of the biomass 5 to be treated, can be dewatered in a dewatering device 6 before being fed into the drying device 4 and subsequently into the pyrolysis reactor 2 to a moisture value in a moisture value range the lower limit of which is 70 wt. %, in particular 80 wt. %, and whose upper limit is 95 wt. %, in particular 90 wt. %, based on the total mass of the biomass 5.

Independently of this dewatering step or in addition to this dewatering step, at least a quantitative proportion of the biomass 5 to be treated, however, in particular the entire quantity of the biomass 5 to be treated, is dried in the drying device 4 before being fed into the pyrolysis reactor 2 to a moisture value in a moisture value range the lower limit of which is 3 wt. %, in particular 5 wt. %, and the upper limit of which is 20 wt. %, in particular 10 wt. %. However, preferably, the entire quantity of the biomass 5 to be treated is subjected to pre-drying. If both the dewatering device 6 and the drying device 4 are provided, they can form a drying facility together.

The biomass 5 to be treated is preferably fed to the pyrolysis reactor 2 with the moisture reduction described above and/or without the moisture reduction described above. In this regard, it is also possible to determine the mass flow of the biomass 5 supplied to the pyrolysis reactor 2 and, if necessary, to store or save it in a controller 7.

The controller 7 is also used to monitor the entire biomass treatment process from its delivery to the end of the entire treatment process and to control all facility parts or facility components according to predefined process steps. The respective communication links between the controller 7 and the individual facility parts or facility components are indicated in dashed lines. Feeding the biomass 5 to the pyrolysis reactor 2 can be carried out by means of a sluice system 8, such as a vertical rotary sluice, in a preferred gas-tight manner.

When the pre-dried biomass 5 has been fed to the pyrolysis reactor 2, the thermochemical conversion and/or treatment of the biomass 5, which can be referred to as pyrolysis process, takes place therein. Here, thermal decomposition of the biomass 5 into pyrolysis coke and pyrolysis gas, in each case with diverse components, takes place. The pyrolysis coke is predominantly a solid fraction, which can also be referred to as carbonisate.

The pyrolysis reactor 2 can be configured, for example, as a screw reactor, in which the thermal decomposition of the biomass 5 takes place at a temperature in a temperature range between 400° C., in particular 450° C., and 600° C., in particular 550° C. This process takes place under oxygen-reduced conditions with a residence time between 20 and 30 min. A low oxygen concentration of less than 5% may be present in the pyrolysis reactor 2.

The resulting pyrolysis gas is usually an oil/gas mixture, possibly with dust-like components. After the treatment of the biomass 5 in the pyrolysis reactor 2 has been performed, the resulting pyrolysis coke and the pyrolysis gas are discharged or drained from the pyrolysis reactor 2 preferably being spatially separated from one another, as is shown in the present exemplary embodiment. A common discharge from the pyrolysis reactor 2 and a later or subsequent separation is also possible.

The pyrolysis gas produced from the biomass 5 in the pyrolysis reactor 2 is in turn fed into the combustion device 3, wherein the pyrolysis gas is combusted to form a flue gas in the combustion device 3. The flue gas produced or formed in this process is discharged from the combustion device 3 and fed to a separate mixing device 9 located or arranged downstream. The combustion product "flue gas" usually still has a residual proportion of oxygen ($O_2$), whereby the oxygen content in the flue gas can be approximately up to 5 vol %.

The mixing device 9 can include, among other things, a mixing chamber into which at least one oxygen-containing gas, such as ambient air and/or oxygen ($O_2$), is admixed or metered in addition to the flue gas originating from the combustion device 3. If at least the pyrolysis gas is combusted by means of the combustion device 3, thermal energy is generated. The flue gas discharged from the combustion device 3 usually has a very high temperature value, which is in a temperature value range the lower limit of which is 800° C., in particular 850° C., and the upper limit of which is 1,200° C., in particular 1,000° C.

For the sake of clarity, metering devices, valves and the like are not shown. It should also be noted that separate measuring arrangements for determining a wide variety of parameters can be provided for control and/or monitoring on or in the mixing device 9. Hence, e.g. the temperatures of all gases fed to the mixing device 9 can be determined separately. As further parameters, e.g. the oxygen content and the proportion or content of the gases that will be described below can also be determined separately. The measuring arrangements are in turn in communication connection with the controller 7. For the sake of simplicity, only one connecting line between the mixing device 9 and the controller 7 is shown.

In the mixing device 9, ambient air and/or oxygen is metered into the flue gas on the one hand, and on the other hand the temperature is reduced and thus cooled by the at least one oxygen-containing gas. The gas mixture leaving the mixing device 9 is subsequently fed directly and preferably without an additional filtering process to the drying device 4 and is therefore referred to as so-called drying gas for easier differentiation of the gases present in the treatment facility 1.

The drying gas discharged from the mixing device 9 should have a temperature value, which is in a temperature value range the lower limit of which is 100° C., in particular 300° C., and the upper limit of which is 700° C., in particular 500° C.

Furthermore, the drying gas discharged from the mixing device 9 should have an oxygen content, which is in an oxygen content value range the lower limit of which is 6 vol % in particular 15 vol % and the upper limit of which is 20 vol % in particular 17 vol %. It is particularly preferred for the oxygen content to not be larger than 17 vol %.

The drying gas discharged from the mixing device 9, inter alia, contains the gas sulfur dioxide ($SO_2$). Sulfur dioxide is a colorless, mucous membrane-irritating, pungent-smelling and sour-tasting toxic gas. Furthermore, the drying gas can also contain sulfur dioxide ($SO_3$) which, at the high temperatures indicated above, also has a gaseous aggregate state.

Below, a further and optionally possible treatment of the pyrolysis coke with the possible method steps is described, which can be carried out, but does not necessarily have to be carried out or performed.

The pyrolysis coke formed from the biomass 5 in the pyrolysis reactor 2 can now, in principle, be conveyed on to a coke treatment device 10 for carrying out a further additional treatment step. This can be done directly. However, it would still be possible for the pyrolysis coke discharged from the pyrolysis reactor 2 to be conveyed to an intermediate container 11 and temporarily stored there before being fed into the coke treatment device 10. The removal from the intermediate container 11 or the step of conveying the pyrolysis coke further from the intermediate container 11 to the coke treatment device 10 can be carried out, for example, by means of a screw conveyor and a cell wheel lock downstream of the screw conveyor.

It should be noted that the sulfur dioxide ($SO_2$) and/or the sulfur trioxide ($SO_3$) can already be contained in the pyrolysis gas and/or in the coke exhaust gas discharged from the coke treatment device 10 and/or in the flue gas. The coke exhaust gas emerging in the coke treatment device 10 can also be referred to as gasifier gas.

When the biomass 5 treated to pyrolysis coke in the pyrolysis reactor 2 in the previous method step is in the coke treatment device 10, the pyrolysis coke is further thermally treated in a possible subsequent method step. This can be carried out and represent a further alternative further treatment. In this regard, the pyrolysis coke is decomposed into a predominantly solid residue product, in particular a free-flowing residue product, and a coke exhaust gas. In this further thermal treatment in the coke treatment device 10, a gasification and/or combustion can be carried out. The coke treatment device 10 can also be referred to as a so-called oxidative coke treater, which allows or permits a gasification and/or a combustion. The usually solid residue product contains the at least one valuable material to which the recovery can be directed. The residue product is discharged from the coke treatment device 10 spatially separated from the coke exhaust gas, wherein the residue product may be collected in a container which is not specified in further detail. The coke exhaust gas may thus be discharged specifically from the coke treatment device 10.

The pyrolysis coke may be gasified in the coke treatment device 10 at a temperature value in a temperature value range the lower limit of which is 400° C., in particular 500° C., and the upper limit of which is 1,000° C., in particular 900° C.

It is also possible to feed the coke exhaust gas discharged from the coke treatment device 10 into the combustion device 3, wherein the coke exhaust gas is also combusted in the combustion device 3 to form the flue gas. The resulting or formed flue gas is also discharged from the combustion device 3. If both gases, namely the pyrolysis gas and the coke exhaust gas, are fed into the combustion device 3, these can be fed into the combustion device 3 being spatially separated from one another and be combusted therein. Independently thereof, however, both gases can also be fed into the combustion device 3 together, as is indicated by an arrow with a dot-dashed line. If both gases are combusted in the combustion device 3, the previously described flue gas is also formed of these two gases and contains, inter alia, the gas sulfur dioxide ($SO_2$) and/or sulfur trioxide ($SO_3$).

To dry the biomass 5, in particular the sludge described above, diversely configured drying devices 4 can be used. In this regard, e.g. the one can be used as was described in DE 10 2010 049 339 A1. In the present treatment facility 1, the drying gas used for this purpose is formed directly from the pyrolysis gas combusted in the combustion device 3 to form the flue gas and, if necessary, from the coke exhaust gas, wherein the usually predetermined volume fraction of oxygen described above has been metered into the flue gas in the mixing device 9 and it thus forms the drying gas.

During the drying of the biomass 5 formed from organic waste products in the drying device 4, the gas ammonia ($NH_3$) is formed or released. At these temperatures, ammonia is a strong pungent-smelling, colorless, water-soluble and toxic gas that is tear-inducing and suffocating.

In the method steps according to the invention, the application and use of the drying gas, in which, inter alia, the gas sulfur dioxide ($SO_2$) is contained, and the ammonia ($NH_3$) results in a chemical reaction of at least these two gases. In this chemical reaction, a solid, crystalline substance, namely ammonium sulfite (($NH_4)_2SO_3$), is formed from the ammonia ($NH_3$) and the sulfur dioxide ($SO_2$). Sulfur trioxide ($SO_3$) may also be present in the drying gas.

Thus, depending on the reaction gas present with the ammonia ($NH_3$), ammonium sulfite (($NH_4)_2SO_3$) and/or ammonium sulfate (($NH_4)_2SO_4$) can be formed. This takes place depending on the temperature of the drying gas supplied to the drying device 4. The ammonium sulfite (($NH_4)_2SO_3$) and/or the ammonium sulfate (($NH_4)_2SO_4$) formed in the drying device 4 are or is fed to the pyrolysis reactor 2 together with the dried biomass 5 and subsequently pyrolyzed.

The gas exiting or discharged from the drying device 4 is referred to as dryer exhaust gas or dryer exhaust air. Due to the previously described binding and conversion of ammonia ($NH_3$), only a conditional chemical and/or physical purification of the dryer exhaust gas or dryer exhaust air has to be carried out or is necessary. It is preferred for the dryer exhaust gas or the dryer exhaust air to be guided through a filtering device 13, which is shown in a simplified manner, before it is discharged to the surroundings. This allows for dust particles, which might be added to the dried biomass 5 during filter cleaning before it is fed into the pyrolysis reactor 2, to be filtered out.

Another flue gas from a block-type thermal power station (BTTP) 12 can also be fed to the mixing device 9. In order to achieve a temperature reduction of the flue gas supplied to the mixing device 9, the further flue gas is to be fed to the mixing device 9 with a temperature value, which is in a temperature value range the lower limit of which is 100° C., in particular 200° C., and the upper limit of which is 500° C., in particular 300° C.

To increase energy efficiency, it can also be provided that a partial quantity of the flue gas discharged from the combustion device 3 is branched off from the flue gas before it is fed into the mixing device 9. The branched-off partial quantity may be referred to as recirculation gas and is subsequently passed through a heat exchanger 14 for heat dissipation or heat reduction. The flue gas temperature of the recirculation gas is thus reduced. The branched-off flue gas is subsequently fed into the combustion device 3 for combustion. The feed into the combustion device 3 can either be carried out together with the pyrolysis gas and/or the coke exhaust gas or a separate feed can be provided, as shown. Furthermore, it is also shown that oxygen, in particular ambient air containing oxygen, is supplied to the combustion device 3 for combustion of the pyrolysis gas and/or the coke exhaust gas and, if necessary, also of the recirculated flue gas. Preferably, a separate supply line is provided for each of the gases described above. The supplied ambient air can also be referred to as combustion air, which can be supplied to the combustion device 3 by means of an indicated conveying device 15.

If, for example, ambient air is selected as the oxygen ($O_2$)-containing gas as the feed gas, it can be passed through the heat exchanger 14 before being fed into the mixing device 9, and its temperature can be raised by means of the partial quantity of the flue gas. Depending on the season, the ambient air has a local ambient temperature from which the temperature increase takes place. After the ambient air forming the metering gas has flown through or passed through, it is fed into the mixing device 9 and metered and mixed with the flue gas present in the mixing device 9. Here, as well, a separate conveying device 15 with the same reference number can be provided, as is indicated. However, it would also be possible to convey the ambient air both to the heat exchanger 14 and to the combustion device 3 with correspondingly arranged line connections and valve arrangements with just one conveying device 15.

At the beginning of the treatment process of the biomass 5, it first is to be dried to a predetermined moisture content in the drying device 4 and, hence, moisture, in particular water, is to be removed. Since, at this time, the pyrolysis reactor 2 is not yet in operation, instead of the drying gas, a flue gas formed from another fuel, such as natural gas, biogas, liquid gas, fuel oil, etc., and/or hot flue gases from other combustion processes, such as exhaust gases from an internal combustion engine or an alternative firing system, is to be formed and fed to the mixing device 9 and in this the drying gas is to be provided for drying the biomass 5 in the drying device 4. The internal combustion engine(s) can, for example, be a gas turbine and/or a gas engine. The alternative firing can, for example, be formed by a biomass boiler or the like. As soon as dried biomass 5 can be fed to the pyrolysis reactor 2 and it is in operation and the pyrolysis gas is fed into the combustion device 3, the initial supply to the drying device 4 can be stopped.

With the previously described treatment facility 1, the biomass 5 provided can be subjected to thermo-chemical treatment. At least the following method steps are to be carried out:

providing the biomass 5 to be treated,
providing a drying device 4,
providing at least one pyrolysis reactor 2,
providing at least one combustion device 3,
providing at least one mixing device 9,
feeding the provided biomass 5 to be treated to the drying device 4, wherein the moisture contained in the biomass 5 is reduced and ammonia ($NH_3$) is released from the biomass 5 during the drying process,
discharging the biomass 5 to be treated from the drying device 4,
feeding the biomass 5 to be treated to the pyrolysis reactor 2,
pyrolyzing the biomass 5 in the pyrolysis reactor 2 and, in the course of this, thermally decomposing the biomass 5 into pyrolysis coke and pyrolysis gas,
discharging the pyrolysis coke and discharging the pyrolysis gas from the pyrolysis reactor 2,
feeding the pyrolysis gas discharged from the pyrolysis reactor 2 into the combustion device 3 and combusting the pyrolysis gas thus forming a flue gas,
discharging the flue gas from the combustion device 3 and feeding the flue gas into the mixing device 9,
adding oxygen ($O_2$) and or at least an oxygen ($O_2$)-containing gas to the flue gas in the mixing device 9 and forming a drying gas, said drying gas containing, inter alia, sulfur dioxide ($SO_2$) and/or sulfur trioxide ($SO_3$), each in a gaseous aggregate state,
discharging the drying gas from the mixing device 9 and feeding the drying gas into the drying device 4,
guiding the drying gas through the drying device 4, wherein the sulfur dioxide ($SO_2$) and/or the sulfur trioxide ($SO_3$), which is inter alia contained in the drying gas, chemically reacts with the ammonia ($NH_3$) to ammonium sulfite (($NH_4)_2SO_3$) and/or ammonium sulfate (($NH_4)_2SO_4$).

FIG. 2 shows a further possible installation model of a possibly independent embodiment of the treatment facility 1, which is also configured or provided to be able to perform the physical and thermochemical treatment of the biomass 5, in particular of organic waste products, such as sludge from sewage treatment plants, slaughterhouses, agricultural operations, animal husbandry, the food industry, the paper industry. Therefore, here as well, equal reference numbers and/or component designations are used for equal parts as in FIG. 1 before. In order to avoid unnecessary repetitions, it is pointed to/reference is made to the detailed description in FIG. 1 preceding it.

As opposed to the treatment facility 1 described above, the biomass 5 is combusted with the intended presence of oxygen and, in the course of this, the flue gas is already provided and/or obtained. The flue gas is preferably and subsequently fed to the drying device 4 for the drying process of the biomass 5, with the mixing device 9 being interposed as required.

The treatment facility 1 preferably comprises a storage for receiving the biomass 5 to be treated, optionally the dewatering device 6, and the drying device 4.

Adjoining the drying device 4, a separate conveying device 16 can optionally, but not necessarily, be provided, by means of which the pre-dried or dried biomass 5 can be conveyed to a downstream combustion facility unit 17 comprising at least one first combustion reactor 18.

Depending on the mass or quantity of biomass 5 to be treated, the combustion facility unit 17 can also comprise multiple combustion reactors, although only one further or second combustion reactor 19 is shown for the sake of clarity. The first combustion reactor 18 may be formed, for example, by a rotary kiln. The second combustion reactor 19 may be formed, for example, by a furnace with grate-firing, such as a stair kiln or the like.

However, it would also be possible, if the combustion facility unit 17 comprises multiple combustion reactors 18, 19 to use combustion reactors 18 or 19 of the same design or based on the same operating principle.

Furthermore, however, at least one of the combustion reactors 18, 19 or all of the combustion reactors 18, 19 can also be formed by a fluidized bed furnace, which is operated based on the fluidized bed combustion. However, at least one of the combustion reactors 18, 19 could also be formed to carry out a dust firing or a cycloid firing.

The aforementioned firing systems represent the most common furnace types currently in use, by means of which rotary kiln firing, grate firing, fluidized bed firing, dust firing, or cycloid firing can be carried out. Any combination or multiple arrangement of the different furnace types can be provided if required. Thus, different biomasses 5 to be treated can be taken into account in the treatment to be carried out.

In the combustion reactor 18, 19 or in the combustion reactors 18, 19 the biomass 5 to be treated is combusted under supply of oxygen ($O_2$) and/or at least one oxygen ($O_2$)-containing gas, wherein this combustion process can also be referred to as an oxidation process. This is also a physical and thermo-chemical treatment of the biomass 5, but by means of a combustion process.

In the pyrolysis process previously shown and described in FIG. 1 by means of the pyrolysis reactor 2, a substoichiometric thermo-chemical conversion or treatment of the biomass 5 to pyrolysis coke and pyrolysis gas takes place.

By the presently provided combustion process of the biomass 5, it is converted in the oxidation process with the oxygen ($O_2$) to a combustion product and the flue gas. The combustion product can be, for example, ash and/or also a product still containing moisture. The combustion product is discharged from or discharged from the combustion reactor (s) 18, 19 and the flue gas is discharged collectively in each case. Preferably, the flue gas can be discharged separately and independently of the combustion product, as indicated in each case by a separate line.

The flue gas or flue gases are fed to the mixing device 9 by means of a line, as has been described previously for the flue gas discharged from the combustion device 3.

In the mixing device 9, ambient air and/or oxygen is metered into the flue gas supplied from the combustion facility unit 17 on the one hand and, on the other hand, the temperature is reduced and thus cooled by the at least one oxygen-containing gas. The gas mixture leaving the mixing device 9 is subsequently fed directly and preferably without an additional filtering process to the drying device 4 and is therefore referred to as so-called drying gas for easier differentiation of the gases present in the treatment facility 1. For this purpose, a dry gas supply line, which is not indicated in further detail, can be provided.

The drying gas discharged from the mixing device 9 should have a temperature value, which is in a temperature value range the lower limit of which is 100° C., in particular 300° C., and the upper limit of which is 700° C., in particular 500° C.

Furthermore, the drying gas discharged from the mixing device 9 should have an oxygen content, which is in an oxygen content value range the lower limit of which is 6 vol % in particular 15 vol % and the upper limit of which is 20 vol % in particular 17 vol %. It is particularly preferred for the oxygen content to not be larger than 17 vol %.

The drying gas discharged from the mixing device 9, inter alia, contains the gas sulfur dioxide ($SO_2$). Sulfur dioxide is a colorless, mucous membrane-irritating, pungent-smelling and sour-tasting toxic gas. Furthermore, the drying gas can also contain sulfur dioxide ($SO_3$) which, at the high temperatures indicated above, also has a gaseous aggregate state.

To increase energy efficiency, it can also be provided that a partial quantity of the flue gas discharged from the combustion facility unit 17 is branched off from the flue gas before it is fed into the mixing device 9. The branched-off partial quantity may be referred to as recirculation gas and is subsequently passed through the heat exchanger 14 for heat dissipation or heat reduction. The flue gas temperature of the recirculation gas is thus reduced. The branched-off flue gas is subsequently, in turn, fed to the combustion facility unit 17, in particular to at least one of the combustion reactors 18, 19, for further combustion.

Furthermore, it is shown that oxygen, in particular ambient air containing oxygen, can also be fed directly to the combustion facility unit 17, in particular to at least one of the combustion reactors 18, 19, and/or mixed with the recirculation gas for post-combustion of the recirculated flue gas. It would also be possible to pass the oxygen ($O_2$) and/or at least the oxygen ($O_2$)-containing gas through a further heat exchanger, which is not shown in more detail, in order to be able to increase the temperature.

Preferably, a separate supply line can be provided for each of the gases described above. The ambient air supplied can also be referred to as combustion air, which can be supplied to the combustion facility unit 17, in particular to at least one of the combustion reactors 18, 19, by means of at least one indicated conveying device 15. Here, a separate conveying device 15 is provided for each one of the combustion reactors 18, 19.

If, for example, ambient air is selected as the oxygen ($O_2$)-containing gas as the feed gas, it can be passed through the heat exchanger 14 before being fed into the mixing device 9, and its temperature can be raised by means of the partial quantity of the flue gas. Depending on the season, the ambient air has a local ambient temperature from which the temperature increase takes place. After the ambient air forming the metering gas has flown through or passed through, it is fed into the mixing device 9 and metered and mixed with the flue gas present in the mixing device 9. Here, as well, a separate conveying device 15 with the same reference number can be provided, as is indicated. However, it would also be possible to convey the ambient air both to the heat exchanger 14 and to the combustion facility unit 17 with correspondingly arranged line connections and valve arrangements with just one conveying device 15.

Furthermore, it is possible that, here as well, a further flue gas originating from a block-type thermal power station (BTTP) 12 is fed to the mixing device 9. The controller 7 can also be provided, in turn, to control or regulate the entire treatment facility 1 and the process sequence with its facility components.

By means of the treatment facility 1 described in FIG. 2, the biomass 5 provided can be treated and subjected, among other things, to the combustion process described. At least the following method steps are to be carried out:
  providing the biomass 5 to be treated,
  providing the drying device 4,
  providing the combustion facility unit 17 with at least one combustion reactor 18, 19,
  providing at least the mixing device 9,
  feeding the provided biomass 5 to be treated into the drying device 4, wherein the moisture contained in the biomass 5 is reduced and ammonia ($NH_3$) is released from the biomass 5 during the drying process,
  discharging the biomass 5 to be treated from the drying device 4,
  feeding the biomass 5 to be treated into the at least one combustion reactor 18, 19,
  combusting the biomass 5 in the at least one combustion reactor 18, 19 and, in the course of this, oxidatively converting the biomass 5 into a combustion product and flue gas,
  discharging the combustion product and discharging the flue gas from the at least one combustion reactor 18, 19,
  feeding the flue gas into the mixing device 9, adding oxygen ($O_2$) and or at least an oxygen ($O_2$)-containing gas to the flue gas in the mixing device 9 and forming a drying gas, said drying gas containing, inter alia, sulfur dioxide ($SO_2$) and/or sulfur trioxide ($SO_3$), each in a gaseous aggregate state, discharging the drying gas from the mixing device 9 and feeding the drying gas into the drying device 4, guiding the drying gas through the drying device 4, wherein the sulfur dioxide ($SO_2$) and/or the sulfur trioxide ($SO_3$), which is inter alia contained in the drying gas, chemically reacts with the ammonia ($NH_3$) to ammonium sulfite (($NH_4)_2SO_3$) and/or ammonium sulfate (($NH_4)_2SO_4$).

Also in this treatment facility 1, the biomass 5 is fed and dried in the drying device 4, after which the dried biomass 5 is conveyed further and fed to at least one of the combustion reactors 18, 19. Due to the combustion process carried out in the combustion facility unit 17, the oxidation and thus the oxidative conversion of the biomass 5 into the combustion product and already into the flue gas takes place. If the combustion process is carried out with a lambda value greater than 1 ($\lambda > 1$), the flue gas formed or produced in the process also still contains a certain amount of oxygen ($O_2$).

In the treatment facility 1 according to FIG. 1, on the other hand, the drying process is followed by feeding into the pyrolysis reactor 2, and there, thermal treatment takes place. One of the decomposition products formed is the pyrolysis gas, which is subsequently fed into the combustion device 3 at its outlet and combusted therein, possibly together with the coke exhaust gas, to form the flue gas.

The flue gas, which is formed either in accordance with the process sequence shown in FIG. 1 or in accordance with the process sequence shown in FIG. 2, is subsequently fed to the mixing device 9. The further process steps are carried out in the same way in each case and the drying gas formed in the mixing device 9 is fed to the drying device 4.

The two process sequences described above differ only in the choice of the facility components for forming the flue gas from the biomass 5 to be treated.

However, it could also be provided that the treatment facility 1 comprises a combination of the previously described facility components for thermo-chemical conversion and/or treatment of the biomass 5. Thus, both the pyrolysis reactor 2, optionally the coke treatment device 10, and the combustion device 3, on the one hand, as well as the combustion facility unit 17 comprising at least one combustion reactor 18, 19 on the other hand, could be used in parallel side by side. In both facility components, the biomass 5 is used to form, among other things, the flue gas, which is then subsequently fed to the mixing device 9. Thus, the different thermo-chemical treatment processes can be combined as required.

With this chemical reaction or these chemical reactions, the ammonia ($NH_3$) is converted into a solid, mostly free-flowing aggregate state depending on the sulfur oxides contained in the drying gas. This would otherwise only be achievable with a possible other additive to be added.

Lastly, it is noted that the individual method steps and their chronological sequence do not obligatorily have to be carried out in the stated order, but a chronological order differing from this is also possible.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Treatment facility
2 Pyrolysis reactor
3 Combustion device
4 Drying device
5 Biomass
6 Dewatering device
7 Control device
8 Sluice system
9 Mixing device
10 Coke treatment device
11 Intermediate container
12 Block-type thermal power station
13 Filter device
14 Heat exchanger
15 Conveying device
16 Conveying device
17 Combustion facility unit
18 First combustion reactor
19 Second combustion reactor

The invention claimed is:

1. A method for physically and thermochemically treating a biomass, the method comprising:
providing a biomass to be treated,
providing a drying device,
providing a pyrolysis reactor,
providing a combustion device,
providing a mixing device,
feeding the biomass to be treated into the drying device, wherein a moisture contained in the biomass is reduced and ammonia ($NH_3$) is released from the biomass during a drying process,
discharging the biomass to be treated from the drying device,
feeding the biomass to be treated into the pyrolysis reactor,
pyrolyzing the biomass in the pyrolysis reactor, thereby thermally decomposing the biomass into pyrolysis coke and pyrolysis gas,
discharging the pyrolysis coke and discharging the pyrolysis gas from the pyrolysis reactor, feeding the pyrolysis gas discharged from the pyrolysis reactor into the combustion device and combusting the pyrolysis gas thus forming a flue gas, discharging the flue gas from the combustion device and feeding the flue gas into the mixing device, adding oxygen ($O_2$) and/or at least an oxygen ($O_2$)-containing gas to the flue gas in the mixing device and forming a drying gas, the drying gas containing, inter alia, sulfur dioxide ($SO_2$) and/or sulfur trioxide ($SO_3$), discharging the drying gas from the mixing device and feeding the drying gas into the drying device, guiding the drying gas through the drying device, wherein the sulfur dioxide ($SO_2$) and/or the sulfur trioxide ($SO_3$), which is inter alia contained in the drying gas, chemically reacts with the ammonia ($NH_3$) to form ammonium sulfite (($NH_4$)$_2SO_3$) and/or to form ammonium sulfate (($NH_4$)$_2SO_4$).

2. The method according to claim 1, wherein the drying gas is brought to a temperature of 100° C. to 700° C. in the mixing device.

3. The method according to claim 1, wherein adding the oxygen ($O_2$) and/or at least the oxygen ($O_2$)-containing gas brings the drying gas to an oxygen content of 6-20 vol % in the mixing device.

4. The method according to claim 1, wherein a further flue gas originating from a block-type thermal power station is fed to the mixing device.

5. The method according to claim 4, wherein the further flue gas is fed to the mixing device at a temperature of 100° C. to 500° C.

6. The method according to claim 1, wherein a partial quantity of the flue gas discharged from the combustion device is branched off before being fed into the mixing device, this partial quantity of the flue gas is passed through a heat exchanger and the flue gas temperature is reduced, and subsequently the branched-off flue gas is fed to the combustion device for combustion.

7. The method according to claim 6, wherein ambient air is passed through the heat exchanger as the oxygen ($O_2$)-containing gas and a temperature of the ambient air is raised by means of the flue gas passed through the heat exchanger and the ambient air is subsequently fed to the mixing device and metered into the flue gas.

8. The method according to claim 1, wherein the pyrolysis coke discharged from the pyrolysis reactor is fed to a coke treatment device and is further decomposed in the coke treatment device into a solid residue product and into a coke exhaust gas.

9. The method according to claim 8, wherein the residue product is spatially separated from the coke exhaust gas by discharging the residue product from the coke treatment device.

10. The method according to claim 8, wherein the coke exhaust gas is discharged from the coke treatment device, is fed into the combustion device and combusted in the combustion device, thus forming a flue gas, wherein the flue gas is discharged from the combustion device.

11. The method according to claim 8, wherein the pyrolysis gas and the coke exhaust gas are fed into the combustion device separately from one another.

12. The method according to claim 8, wherein the pyrolysis gas and the coke exhaust gas are fed into the combustion device together.

13. The method according to claim 1, wherein the ammonium sulfite (($NH_4$)$_2SO_3$) and/or the ammonium sulfate (($NH_4$)$_2SO_4$) are formed in the drying device and is/are fed to the pyrolysis reactor together with the biomass.

14. A method for physically and thermochemically treating a biomass, the method comprising:
providing a biomass to be treated,
providing a drying device,
providing a combustion facility unit with a combustion reactor,
providing a mixing device,
feeding the biomass to be treated into the drying device, wherein a moisture contained in the biomass is reduced and ammonia ($NH_3$) is released from the biomass during a drying process,
discharging the biomass to be treated from the drying device,
feeding the biomass to be treated into the combustion reactor,
combusting the biomass in the combustion reactor, thereby oxidatively converting the biomass into a combustion product and flue gas,
discharging the combustion product and discharging the flue gas from the at least one combustion reactor
feeding the flue gas into the mixing device,
adding oxygen ($O_2$) and/or at least an oxygen ($O_2$)-containing gas to the flue gas in the mixing device and forming a drying gas, the drying gas containing, inter alia, sulfur dioxide ($SO_2$) and/or sulfur trioxide ($SO_3$),
discharging the drying gas from the mixing device and feeding the drying gas into the drying device,
guiding the drying gas through the drying device, wherein the sulfur dioxide ($SO_2$) and/or the sulfur trioxide ($SO_3$), which is inter alia contained in the drying gas, chemically reacts with the ammonia ($NH_3$) to form ammonium sulfite (($NH_4$)$_2SO_3$) and/or to form ammonium sulfate (($NH_4$)$_2SO_4$).

15. The method according to claim 14, wherein the combustion facility unit is formed of multiple combustion reactors and wherein the flue gas in each case formed in these during the combusting is fed to the mixing device.

16. The method according to claim 14, wherein the drying gas is brought to a temperature of 100° C. to 700° C. in the mixing device.

17. The method according to claim 14 wherein adding the oxygen ($O_2$) and/or at least the oxygen ($O_2$)-containing gas brings the drying gas to an oxygen content of 6-20 vol % in the mixing device.

18. The method according to claim 14, wherein a partial quantity of the flue gas discharged from the combustion facility unit is branched off before being fed into the mixing device, this partial quantity of the flue gas is passed through a heat exchanger and the flue gas temperature is reduced, and subsequently the branched-off flue gas is fed to the combustion facility unit for combustion.

19. The method according to claim 18, wherein ambient air is passed through the heat exchanger as the oxygen ($O_2$)-containing gas and a temperature of the ambient air is raised by means of the flue gas passed through the heat exchanger and the ambient air is subsequently fed to the mixing device and metered into the flue gas.

20. The method according to claim 14, wherein the ammonium sulfite (($NH_4$)$_2SO_3$) and/or the ammonium sulfate (($NH_4$)$_2SO_4$) are formed in the drying device and is/are fed to the combustion facility unit together with the dried biomass.

* * * * *